Sept. 14, 1965 T. G. LEARY 3,206,214

TRANSPORTING AND PROTECTING CASES FOR DRUM AND DISK RECORDS

Original Filed Oct. 23, 1961 2 Sheets-Sheet 1

*INVENTOR.*
THOMAS GEORGE LEARY
*BY* George E. Roush
ATTORNEY

Sept. 14, 1965 T. G. LEARY 3,206,214

TRANSPORTING AND PROTECTING CASES FOR DRUM AND DISK RECORDS

Original Filed Oct. 23, 1961 2 Sheets-Sheet 2

United States Patent Office 3,206,214
Patented Sept. 14, 1965

3,206,214

TRANSPORTING AND PROTECTING CASES FOR DRUM AND DISK RECORDS

Thomas George Leary, San Jose, Calif., assignor to International Business Machines Corporation, Armonk, N.Y., a corporation of New York Continuation of application Ser. No. 146,775, Oct. 23, 1961. This application Apr. 22, 1965, Ser. No. 454,763
10 Claims. (Cl. 274—42)

Figures 1, 2B:
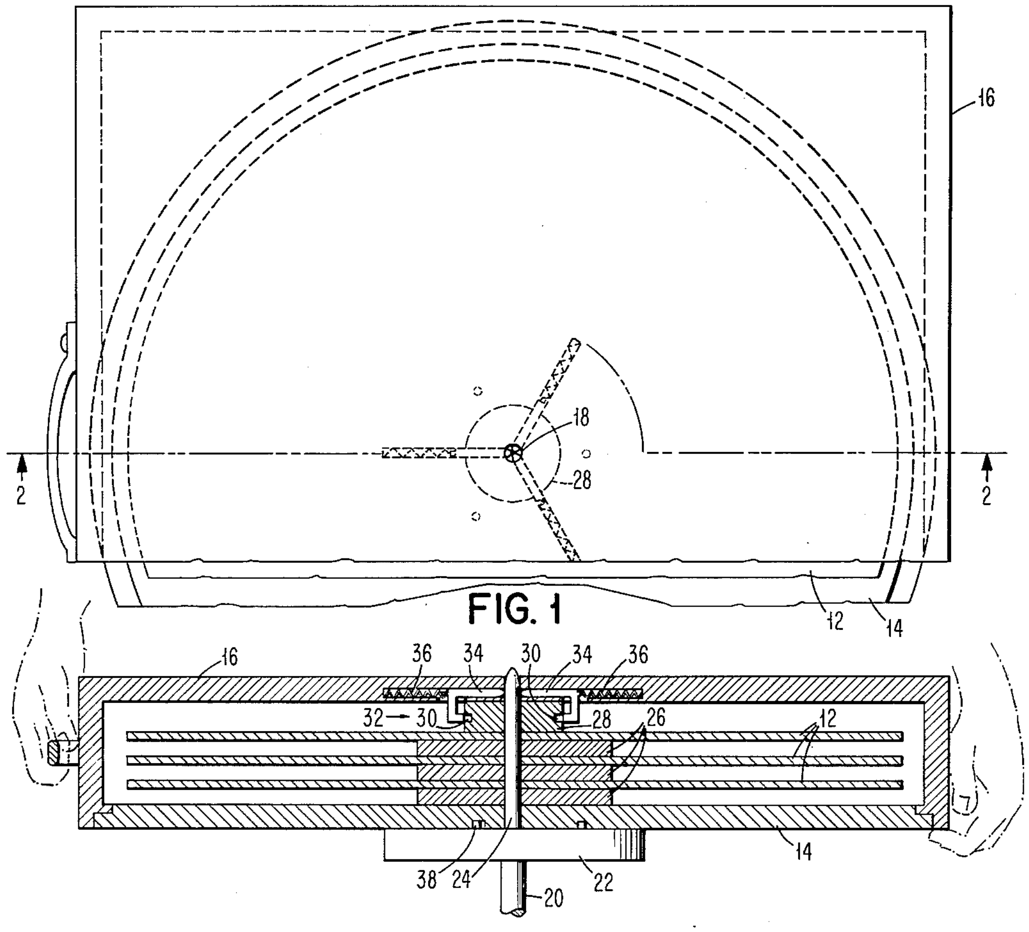

This is a continuation of a copending application Serial No. 146,775, filed October 23, 1961, now abandoned.

The invention relates to transporting and protecting cases for record media, and it particularly pertains to combined covering and carrying cases for magnetic disk and drum records for computing and data processing systems, although it is not limited to such records or systems.

It has been suggested that magnetic disk and drum media for computing and data processing systems be removable and interchangeable as tape records for such systems presently are, and this is considered readily accomplishable for systems employing a relatively narrow drum, or one or a few disks. Such record media are prone to damage when removed from the protective covering of computing or data processing equipment. For example, data has been recorded which is susceptible to erasure by stray magnetic fields. The somewhat delicate magnetic coating is susceptible to scratching, and even the accumulation of dust on the structure is a considerable problem.

It is an object of the invention to provide a combined protecting and carrying case for record media which is low in cost, tamper proof, dust proof, shock resistant, easily handled, readily stored and conveniently labeled.

It is another object of the invention to provide such a case for recording media which will permit the exposure of the delicate surfaces only when the media is installed in the computing or data processing equipment.

According to the invention, record media in the form of tapes, disks or relatively narrow drums are readily removed from apparatus in conjunction with which operation is intended and protected by means of an enclosure, a portion of which is arranged for supporting the tapes, disks or drums in operative relationship to said equipment.

The apparatus has a shaft for rotating the record media and preferably, but not necessarily, there is a turntable arranged on the shaft for receiving the record media, which turntable is preferably equipped with a spindle having a tapered free end extending from the rotational center of the shaft and turntable. The protective enclosure has an aperture therethrough for receiving the spindle and locking means arranged within the enclosure in the vicinity of the aperture to be actuated by the spindle as the entire assembly is lowered over the spindle onto the turntable.

The protective enclosure according to the invention comprises two major portions; a circular disk bottom cover portion and a complementary top cover portion, which may be cylindrical, but preferably is in the form of a square based right prism for convenience in handling and storage. The circular disk bottom cover portion bears the record media and annular disk member having a peripheral groove therein arranged above the record media. The top cover portion contains a clevis comprising a plurality of resiliently urged clevis members having the extremities of given arms meeting at the center of the aperture and radially arranged thereabout. The extremities of other arms of the clevis members are arranged to enter the peripheral groove of the annular disk member for locking the top cover portion onto the circular disk bottom cover portion when the entire assembly is off the turntable and spindle. The spindle serves to separate the extremities of the longer arms of the clevis members from each other and at the same time withdraw the shorter arms from the peripheral groove of the locking disk member, so that the top cover portion of the enclosure may be readily removed from the bottom cover and record media, permitting access of the transducer to the record media.

Figure 2A:
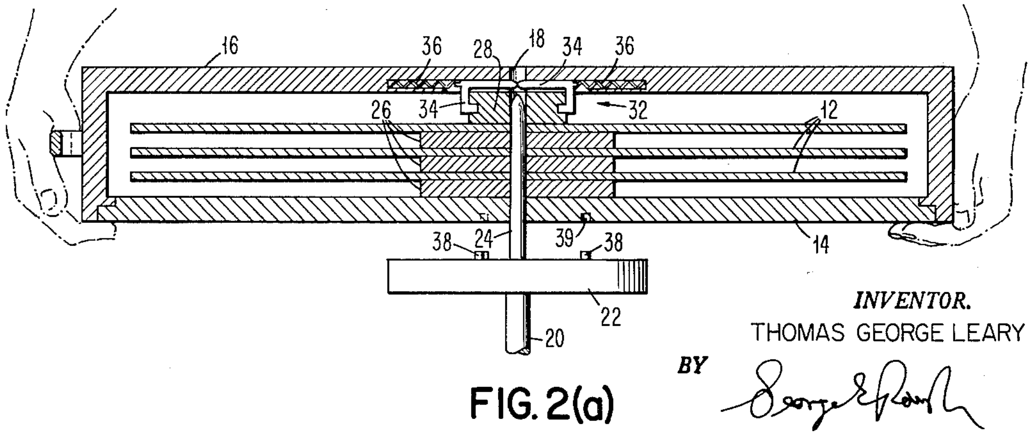
Figure 3:
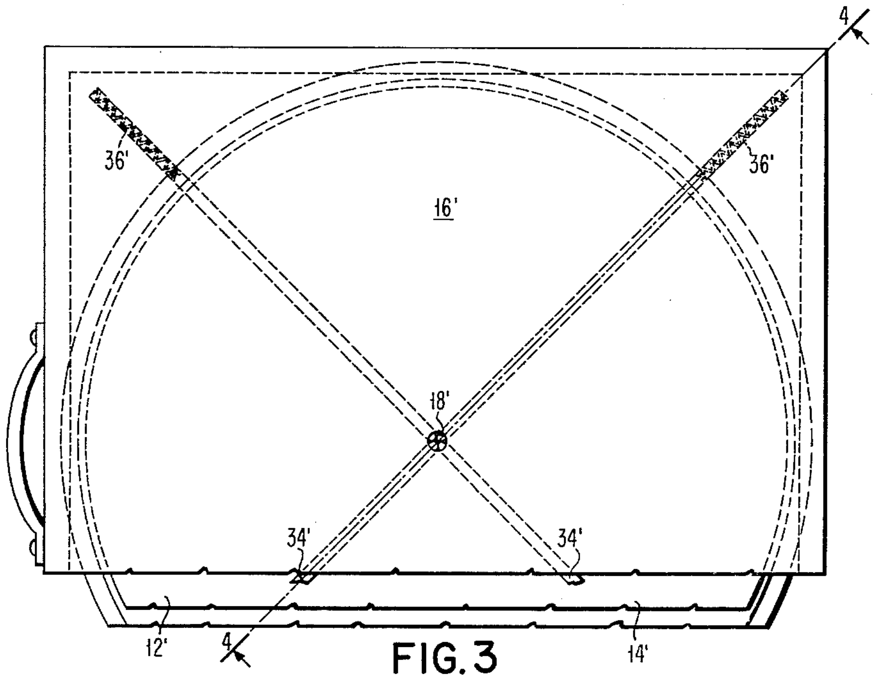
Figure 4A:
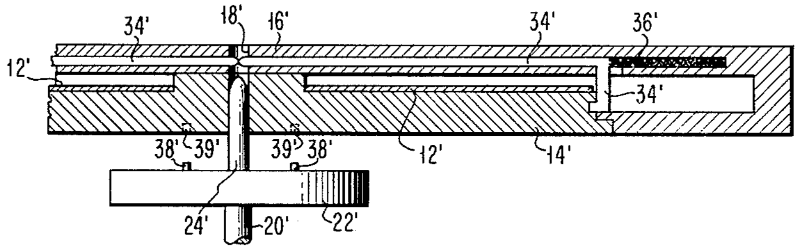
Figure 4B:
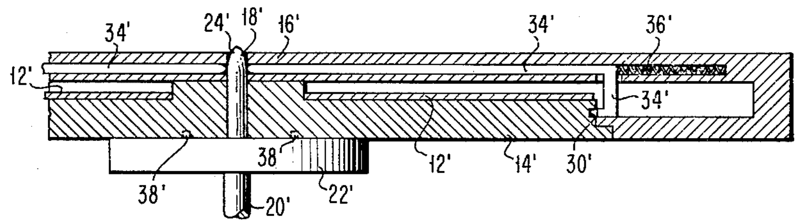

In order that full advantage of the invention may be realized, preferred embodiments thereof are described hereinafter with reference to the accompanying drawings forming a part of the specification and in which:

FIG. 1 is a plan view, partly cut away, of an enclosure according to the invention;

FIGS. 2(*a*) and 2(*b*) are cross sections of the enclosure shown in FIG. 1 taken along the line 2—2 and illustrating the operation of the locking means within the enclosure according to the invention;

FIG. 3 is a plan view, partly cut away, of an alternate enclosure according to the invention; and FIGS. 4(*a*) and 4(*b*) are cross sections of the enclosure shown in FIG. 3 taken along the line 4—4.

FIG. 1 shows a portion of an assembly for enclosing a record in the form of a plurality of disks 12 stacked one above another and an enclosure therefor comprising a bottom cover portion 14 and a top cover portion 16 having an aperture 18 therethrough.

As shown in FIG. 2(*a*) the assembly is placed over the apparatus in conjunction with which it is to operate, only the basic elements of the mechanism for rotating the disks 12 comprising a shaft 20, a turntable 22 and a spingle 24 being shown in the interest of clarity. As shown, a plurality of record disks 12 are supported on the bottom cover portion 14 by means of a plurality of spacing disks 26 permitting access to both sides of the disk 12 by the associated transducer apparatus (not shown). The arrangement as shown is for transducers and transducer access mechanisms of the type shown in U.S. Patent 2,925,238, issued February 16, 1960 to John J. Lynott, but it is considered obvious that those skilled in the art can adapt the invention for other record media and other transducers. The record disks 12 and the spacer disks 26 are maintained in fixed relationship to the bottom cover portion 14 for rotation therewith. Also in fixed relationship to the bottom cover portion 14 is a disk portion 28 having a peripheral groove 30 therearound for accepting arms of a clevis 32 for locking the circular bottom cover disk portion 14 to the top cover portion 16. A wide variety of well known means are available to the artisan for fixing the disks 12, 26 and 28 to the bottom cover 14. The clevis 32 comprises a plurality of J-shaped clevis members 34, three being shown, arranged in the top cover portion 16 and urged centrally of the top cover portion 16 by resilient means, shown as springs 36. The extremities of the longer arms of the clevis members 34 are free to come together centrally of the aperture 18 in which position the bottom cover is locked to the top cover enclosing and protecting the disks 12 as shown in FIG. 2(*a*).

Gently forcing the assembly downward onto the turntable 22 and around the spindle 24 will unlock the top cover portion 16 from the remainder of the assembly as described hereinafter. When the machine is in operation, rotation of the bottom cover disk portion 14 and the disks 12 may be accomplished by frictional engagement of the bottom cover disk portion 14 with the turntable 22, or if desired, driving bosses 38 are provided on the turntable 22 and complementary driving bores 39 are provided in the bottom of the disk cover portion 14, as shown. A splined or otherwise key-shaped spindle and complementary shaped aperture 18 in the bottom cover 14 is also suggested for positive drive engagement should such be desirable.

The assembly is lowered onto the turntable 22, as shown in FIG. 2(*a*), with the operator's hands especially supporting the bottom cover disk portion 14. As the assembly is lowered, the tapered upper end of the spindle 24 forces the clevis members 34 radially outward from the central aperture 18, freeing the shorter arms of the J-shaped clevis members from the groove 30, as shown in FIG. 2(*b*). At this point the top cover portion 16 may be lifted off the assembly leaving the disks 12 free for application of the transducer (not shown).

To replace the top cover 16 it is merely necessary to place the top cover over the tapered spindle 24 and gently force it down to open the clevis 32, as shown in FIG. 2(*b*). At the bottom of the stroke, the hands are slipped under the bottom cover 14 and the entire assembly is then lifted upward and locked together, as shown in FIG. 2(*a*).

While the invention has been particularly shown and described with reference to record media in the form of disks which may be coated on either side with magnetic material for use with an electromagentic transducer or cut for mechanical reproduction as transcription disks and phonograph records, it will be understood that those skilled in the art may make various changes in form and details without departing from the spirit and scope of the invention. For example, a single disk record assembly according to the invention may comprise only a top cover, a bottom cover on the upper side of which the record media is born and a clevis. In other embodiments of the invention, the bottom cover itself may be grooved for the shorter arms of the clevis and the separate locking disk eliminated. In such forms, the clevis members preferably are arranged in the corner portions of the square top cover portions. An embodiment of the invention incorporating some of these suggestions is shown in FIGS. 3 and 4. Primed reference numerals are used to show the correspondence of the parts to the previously described embodiment. Here the annular locking groove 30′ is in the bottom disk cover 14′. The clevis members 34′ are longer but function in exactly the same manner as before. The record medium comprises a layer 12′ of magnetic record material on the inner surface of the bottom disk cover 14′ so that the record disk is in this embodiment born on the bottom cover disk. It is also contemplated that the disks 12 may be replaced by a narrow drum with which an electromagnetic transducer is arranged to be positioned at the periphery of the drum. It is suggested that an enclosure according to the invention will be found useful with magnetic tape records as well. For use with magnetic record media the enclosure preferably incorporates magnetic shielding material.

The invention claimed is:

1. A protective enclosure for record media adapted for rotation on a mechanism having a spindle projecting from the rotational center thereof, comprising:
  a plurality of disk members stacked one on the other and having axial apertures therethrough in registry,
  one of said disk members having a peripheral groove therearound,
  at least one of said disk members having said record medium arranged thereon, and
  one of said members forming a bottom cover for said protective enclosure,
  a top cover arranged for cooperating with said bottom cover, and
  a set of clevis members arranged in said top cover and resiliently urged to grip said grooved disk member within said peripheral groove for maintaining engagement of said top and bottom covers and having elements arranged in proximity of said apertures for engaging said spindle when said enclosure is on said mechanism to operate said clevis members to permit removal of said top cover.

2. A portable record package for use with a record processing machine comprising:
  a disk record,
  a protective enclosure for said disk record having
  a bottom cover in the form of a disk to which said record is affixed for movement therewith,
  a top cover interlocking with said bottom cover, and
  means arranged within said enclosure having an element affixed to said bottom cover and other elements affixed to said top cover for locking said enclosure about said disk record when off said machine, and
  means on said machine operable with said locking means for disengaging said one element from said other elements permitting removal of said top cover when said bottom cover and said record are on said machine.

3. The combination of a magnetic disk record,
  a machine operating in conjunction with said record and
  an enclosure for carrying and protecting said record when removed from said machine,
  said machine including means for rotating said record and
  said rotating means having a spindle projecting from the rotational center thereof,
  said enclosure comprising a circular bottom cover arranged for rotation by said rotating means,
  means affixing said magnetic disk record to said circular bottom cover for rotation therewith,
  a top cover engageable with said bottom cover and
  clevis means having an element affixed to said circular bottom cover and elements arranged in said top cover operable with said spindle for preventing said record from being removed from said enclosure when off said machine turntable and for releasing said bottom cover and record from said top cover upon actuation by said spindle.

4. The combination of a number of magnetic disk records,
  a machine operating in conjunction with said records and
  an enclosure for carrying and protecting said records when removed from said machine,
  said machine including a turntable for rotating said records,
  said turntable having a spindle projecting from the rotational center thereof,
  said spindle having a tapering free upper end,
  said enclosure comprising a circular bottom cover arranged for rotation by said turntable,
  means affixing said magnetic disk records to said circular bottom cover for rotation therewith,
  a top cover engageable with said bottom cover and
  clevis means having an element affixed to said circular bottom cover and elements arranged in said top cover operable with said tapered spindle for preventing said records from being removed from said enclosure when off said machine turntable and for releasing said bottom cover and records from said top cover upon actuation by said tapered spindle.

5. A protective enclosure for a record medium adapted to be rotated by a mechanism having a spindle projecting from the rotational center thereof,
  said enclosure comprising an interlocking set of top and bottom covers,
  said bottom cover being a circular disk member adapted for rotational movement on said mechanism and having a peripheral groove thereabout,
  said record medium being affixed to said bottom cover in the interior of said enclosure,
  a set of clevis members arranged in said top cover and resiliently urged to grip said bottom cover within said peripheral groove,
  thereby maintaining engagement of said top and bottom covers, and there being apertures in registry through said covers permitting entry of said spindle to operate said clevis members for disengaging said top cover from said bottom cover and exposing said record medium.

6. A protective enclosure for a record medium adapted to be rotated by a mechanism having a spindle projecting from the rotational center thereof, said enclosure comprising an interlocking set of top and bottom covers, one of said covers having an annular disk portion with a peripheral groove in one of the cylindrical walls thereof, the other of said covers having locking means arranged therein, said locking means gripping said one cover within said peripheral groove, thereby maintaining engagement of said top and bottom covers, one of said covers bearing said record medium and arranged for rotational movement by said mechanism, and there being apertures in registry in said covers permitting entry of said spindle to operate said locking means for disengaging said top cover from said bottom cover and exposing said record medium.

7. A portable record package for use with a record processing machine comprising:

a record member, a protective enclosure for said record having a circular member to which said record member is affixed for movement therewith, a cover member surrounding said circular member and said record member, and means arranged within said enclosure having an element affixed to said circular member and other elements affixed to said cover member for locking said cover member about said record member when off said machine, and means on said machine operable with said locking means for disengaging said element from said other elements permitting removal of said cover member when said circular member and said record member are on said machine.

8. The combination of a record, a machine operating in conjunction with said record, and an enclosure for protecting said record when removed from said machine, said machine including means for rotating said record and said rotating means having a spindle projecting from the rotational center thereof, said enclosure comprising a circular member arranged for rotation by said rotating means, means affixing said record to said circular member for rotation therewith, a cover enveloping said circular member and said affixed record, and clevis means having an element affixed to said circular member and elements arranged in said cover member operable with said spindle for preventing said record from being removed from said enclosure when off said machine turntable and for releasing said circular member and said record upon actuation by said spindle.

9. A portable record package for use with a record processing machine comprising:

a plurality of spaced parallel record members, a protective enclosure for said record members having a circular member to which said record members are affixed for movement therewith, a cover member enveloping said circular member and said record members, and means arranged within said enclosure having an element affixed to said circular member and other elements affixed to said cover member for locking said cover member about said record members when off said machine, and means on said machine operable with said locking means for disengaging said element from said other elements permitting removal of said cover member when said circular member and said record members are on said machine.

10. The combination of a record, a machine operating in conjunction with said record, and an enclosure for protecting said record when removed from said machine, said machine including means for driving said record, and said driving means having a spindle, said enclosure comprising a circular member arranged to be driven by said driving means, means affixing said record to said circular member for being driven therewith, a cover enveloping said circular member and said affixed record, and locking means having an element affixed to said circular member and elements arranged in said cover member operable with said spindle for preventing said record from being removed from said enclosure when off said spindle and for releasing said circular member and record upon actuation by said spindle.

References Cited by the Examiner

UNITED STATES PATENTS

| | | | |
|---|---|---|---|
| 1,766,046 | 6/30 | Prescott et al. | 274—42 |
| 2,344,919 | 3/44 | Kelly | 274—42 |
| 2,366,940 | 1/45 | Solkover | 274—42 |
| 2,555,594 | 6/51 | Markovitz | 274—42 |
| 2,678,861 | 5/54 | Funk | 274—42 |
| 2,802,670 | 8/57 | Becton | 274—42 |
| 2,881,004 | 4/59 | Hahn | 274—1 |
| 3,007,702 | 11/61 | Ely | 274—1 |

NORTON ANSHER, *Primary Examiner.*